(12) United States Patent
Kobayashi et al.

(10) Patent No.: US 6,396,785 B1
(45) Date of Patent: May 28, 2002

(54) OPTICAL DISK APPARATUS

(75) Inventors: Shohei Kobayashi, Hachioji; Junichi Nakano, Hino, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/233,756

(22) Filed: Jan. 20, 1999

(30) Foreign Application Priority Data

Jan. 22, 1998 (JP) ............................................. 10-010464

(51) Int. Cl.[7] .................................................. G11B 7/00
(52) U.S. Cl. ..................................... 369/53.26; 369/116
(58) Field of Search .......................... 369/116, 54, 121, 369/47.5, 47.51, 47.52, 53.26, 53.27

(56) References Cited

U.S. PATENT DOCUMENTS

| | | | | |
|---|---|---|---|---|
| 4,507,767 A | * | 3/1985 | Takasugi | 369/116 |
| 4,685,097 A | * | 8/1987 | van der Put | 369/116 |
| 5,170,389 A | * | 12/1992 | Numata et al. | 369/116 |
| 6,044,041 A | * | 3/2000 | Ishizaki et al. | 369/13 |

OTHER PUBLICATIONS

Nikkei Byte, Sep. 1997, No. 168, pp. 148–151, Masato Yokoyama, Nikkei BP Co., Ltd., Japan.

Nikkei Electronics, Sep. 1997, pp. 13–14, Mamoru Harada, Nikkei BP. Co., Ltd., Japan.

* cited by examiner

*Primary Examiner*—Thang V. Tran
(74) *Attorney, Agent, or Firm*—Frishauf, Holtz, Goodman, Langer & Chick, P.C.

(57) ABSTRACT

The present invention avoids a loss of information recorded on or information to be recorded onto an optical disk by accepting a state of deterioration of a semiconductor laser in a closed-type optical disk apparatus. The optical disk is rotated in a predetermined direction by a driving of a spindle motor through a motor driver based on an instruction from a control section. Information is recorded onto or reproduced from the optical disk by a semiconductor laser driven through a laser driver based on an instruction from the control section. The state of progress of deterioration of the semiconductor laser is monitored by a monitoring section, and this state is displayed by a light display section according to a deterioration state.

28 Claims, 3 Drawing Sheets

OPTICAL DISK APPARATUS

BACKGROUND OF THE INVENTION

The present invention relates to an optical disk apparatus, and relates, more particularly, to a closed-type optical disk apparatus capable of monitoring deterioration of a light source of an optical head by closing an optical disk and the light head.

In recent years, there has been used an optical disk as a rewritabe recording medium having a large recording capacity, and an optical disk apparatus using this optical disk in a closed state has also been developed. At the same time, there has also been progressed a reduction in size and weight of the optical disk apparatus as a whole.

There is a description of an article of "A new optical recording technique for achieving 10 G-bit/square inches in 1998" relating to a Near-Field recording on the "NIKKEI BYTE", September 1997 issue, on page 148. At the middle of page 148 of this article, there is a description of "both a fixed-type disk as a hard disk and a removable-type disk" to indicate a large-capacity optical hard disk apparatus as a new optical recording technique. In general, a fixed-type disk like a hard disk is usually fixed in a closed state within an apparatus.

In the next paragraph of the above expression in the article, it is also described that a red-color laser is used for a laser to be used for an optical pick-up for the optical disk apparatus.

When a n apparatus is structured by setting an optical disk into a closed and fixed state like a hard disk, it is inevitable that the disk cannot be replaced. If this optical disk apparatus is in failure, the information recorded on the closed and fixed optical disk is lost.

Further, since the optical disk apparatus uses a semiconductor laser, the optical disk apparatus may become out of order due to deterioration of this semiconductor laser.

As explained above, there has been a problem that if a failure of the optical disk apparatus is attributable to deterioration of a semiconductor laser, information already recorded and/or information to be recorded onto the closed and fixed optical disk is lost.

BRIEF SUMMARY OF THE INVENTION

It is, therefore, an object of the present invention to provide an optical disk apparatus capable of avoiding a loss of information recorded and/or information to be recorded on to a closed and fixed optical disk if a failure of the optical disk apparatus is attributable to deterioration of a semiconductor laser.

It is another object of the present invention to provide an optical disk apparatus capable of enabling a user to know deterioration or a beginning of deterioration of a semiconductor laser and capable of prohibiting a recording operation once deterioration of the semiconductor laser has started.

In other words, it is a first object of the invention to provide an optical disk apparatus having closed therein an optical recording medium capable of rewriting and reproducing information and a semiconductor laser capable of recording information onto or reproducing information from the recording medium, the optical disk apparatus comprising:

a monitoring section for monitoring a progress state of deterioration of the semiconductor laser;

a deterioration decision section for deciding a state of deterioration of the semiconductor laser based on a result of a monitoring of the monitoring section; and a posting section for informing a result of a decision of the deterioration decision section to the outside of the apparatus.

It is a second object of the invention to provide an optical disk apparatus having closed therein an optical recording medium capable of rewriting and reproducing information and a semiconductor laser capable of recording information onto or reproducing information from the recording medium, the optical disk apparatus comprising:

a monitoring section for monitoring a progress state of deterioration of the semiconductor laser;

a deterioration decision section for deciding a state of deterioration of the semiconductor laser based on a result of a monitoring of the monitoring section; and a control section for stopping only an operation of recording information onto the optical recording medium by the semiconductor laser if the deterioration decision section has made a decision that deterioration of the semiconductor laser is in progress.

It is a third object of the invention to provide an optical disk apparatus having closed therein an optical recording medium capable of rewriting and reproducing information and a semiconductor laser capable of recording information onto or reproducing information from the recording medium, the optical disk apparatus comprising:

a monitoring section for monitoring a progress state of deterioration of the semiconductor laser;

a deterioration decision section for deciding a state of deterioration of the semiconductor laser based on a result of a monitoring of the monitoring section; and a control section for stopping the driving of the semiconductor laser if the deterioration decision section has made a decision that the semiconductor laser is deteriorated.

Since the optical disk apparatus of the present invention has an electric circuit for monitoring the progress of deterioration of the semiconductor laser and the display section for displaying deterioration or a starting of deterioration of the semiconductor laser, it is possible to protect information recorded on the optical disk closed within the optical disk apparatus.

Further, since the optical disk apparatus of the present invention has an electric circuit for monitoring the progress of deterioration of the semiconductor laser and the apparatus prohibits the recording of information when a starting of deterioration of the semiconductor laser is deteriorated, it is also possible to avoid the loss of information due to a sudden incapability of recording during a recording operation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will now be explained below with reference to the drawings.

Figure 1:
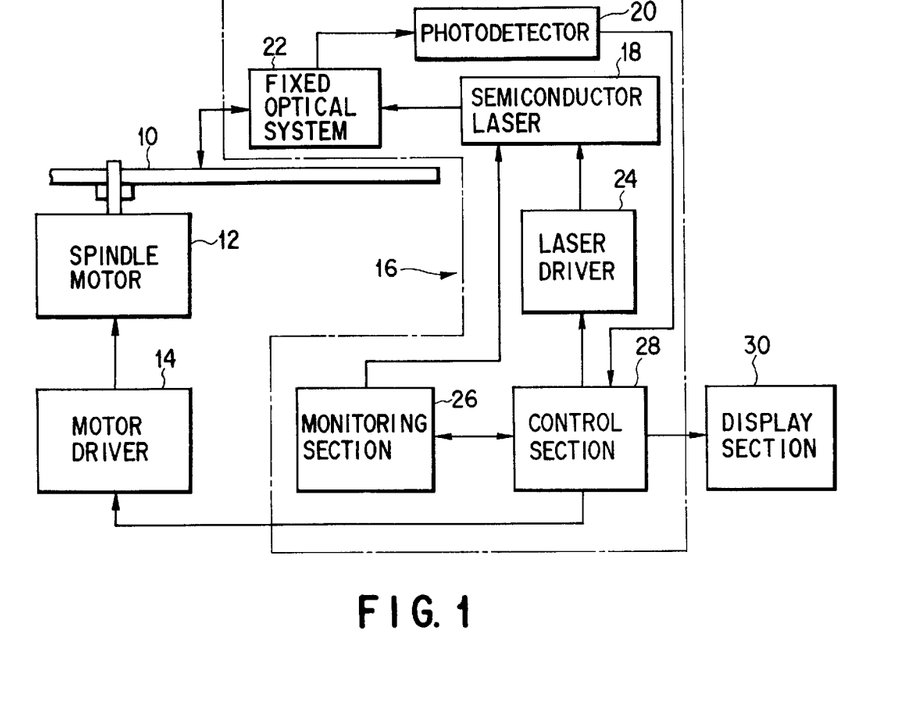
FIG. 1 is a block configuration diagram for schematically showing an overall structure of an optical disk apparatus according to a first embodiment of the present invention.

FIG. 1 is a block configuration diagram for schematically showing an overall structure of an optical disk apparatus according to a first embodiment of the present invention.

In FIG. 1, the optical disk apparatus has an optical disk 10 as a rewritable optical recording medium, a spindle motor 12 as optical disk rotation means for rotating the optical disk 10 in a predetermined direction at a predetermined rotational speed, a motor driver 14 and a swing-arm type optical pick-up 16.

The swing-arm type optical pick-up 16 is structured to be movable in a radial direction of the optical disk 10 along a recording layer formed on an upper surface of the optical disk 10, for recording information by utilizing light onto the recording layer on the upper surface of the optical disk 10 and for reading information from the recording layer by a light reflected from the recording layer.

The swing-arm type optical pick-up 16 mainly includes a semiconductor laser 18 as a light source, a fixed optical system 22 for guiding a laser beam emitted from the semiconductor laser 18 onto the recording layer on the upper surface of the optical disk 10 and for guiding a reflected beam from the recording layer to a photodetector 20, a laser driver 24 for driving the semiconductor laser 18, a monitoring section 26 for monitoring deterioration of the semiconductor laser 18, and a control section 28 for controlling the operation of the motor driver 14, the photodetector 20, the laser driver 24, the monitoring section 26 and known swing-arm driving means, not shown, for swinging the swing-arm type optical pick-up 16.

To the control section 28, there is further connected a display section 30 for displaying a predetermined deterioration of the semiconductor laser 18 by operating alarm means such as, for example, a light-emitting diode (LED), not shown, when the monitoring section 26 has detected the predetermined deterioration of the semiconductor laser 18.

In this case, the motor driver 14, the laser driver 24, the monitoring section 26 and the control section 28 are structured by electric and electronic circuits.

The control section 28 can be disposed outside the swing-arm type pick-up 16 instead of the inside thereof.

The monitoring section 26 is for monitoring a waveform of a laser beam emitted from the semiconductor laser 18, for example. The monitoring section 26 can utilize a deterioration decision circuit for monitoring known droop characteristics that are generated when a light-emitting power becomes high at the time of deterioration of the semiconductor laser 18.

Figure 2:
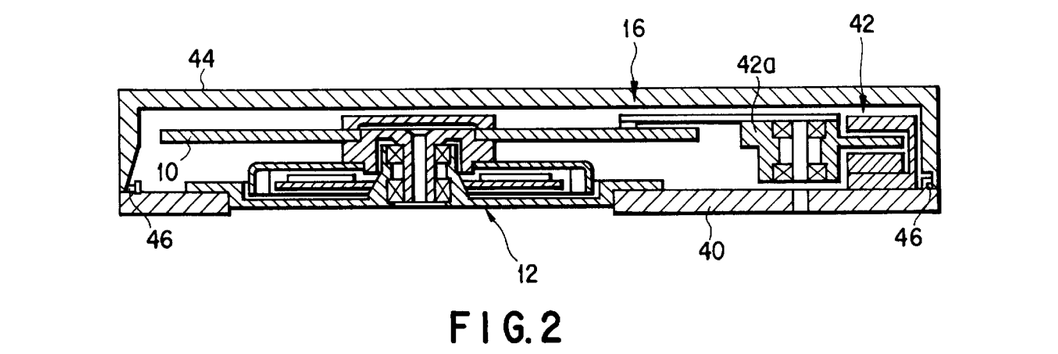
FIG. 2 is a vertical cross-sectional view for schematically showing a mechanical structure of the optical disk apparatus in FIG. 1.

FIG. 2 is a vertical cross-sectional view for schematically showing a mechanical structure of the optical disk apparatus in FIG. 1.

As shown in FIG. 2, the spindle motor 12 of the optical disk apparatus according to the first embodiment of the present invention is a flat motor and is disposed on a substrate 40. On the substrate 40, there is further disposed, at a position adjacent to the periphery of the optical disk 10, a voice coil motor 42, for example, as the swing-arm driving means, not shown in FIG. 1, for the swing-arm type optical pick-up 16. Instead of the voice coil motor 42, a rack driving or a feed screw driving may also be provided. The swing-arm type optical pick-up 16 is supported by a swing carriage 42a of the voice coil motor 42.

The structures of the above-described spindle motor 12 and the voice coil motor 42 respectively are similar to the structures of a spindle motor and a voice coil motor for a conventionally well-known swing-arm type magnetic pick-up combined with a magnetic hard disk in a conventionally well-known magnetic hard disk apparatus, and therefore, detailed explanation of these structures will be omitted here.

The substrate 40 is covered with a cover plate 44 through a gasket 46. In a clean room, and in a closed space surrounded by the substrate 40 and the cover plate 44, there is provided the optical disk apparatus according to the first embodiment of the present invention including the spindle motor 12, the optical disk 10, the voice coil motor 42 and the swing-arm type optical pick-up 16. With this arrangement, the optical disk apparatus is isolated from foreign materials such as dusts and impurities.

The swing-arm type optical pick-up 16 of the mode of the present embodiment is used for recording information onto the recording layer of the optical disk 10 or for reproducing information based on a reflected light from the recording layer, by further pin-pointing a light beam from the laser beam source by a floating type solid immersion lens (SIL) known from the "NIKKEI BYTE" of the September 1997 issue and the "NIKKEI ELECTRONICS" of the Sep. 22, 1997 issue, for example.

The floating type solid immersion lens becomes buoyant to a height of about 100 nm to about 150 nm above the recording layer formed on the surface of the optical disk 10. This is due to a wind generated along with a rotation of the optical disk 10 just like a floating type magnetic head to a magnetic hard disk in a conventional magnetic disk apparatus. Accordingly, an optical recording and reproducing method using the floating type solid immersion lens is called a near field recording as compared with a conventional optical recording method called a far field recording, according to which an optical head like a CD or a DVD keeps a distance of 1 mm or above from the surface of the optical disk.

In the near field recording, a laser beam used for recording or reproducing can have a thickness of approximately one tenth of the thickness of a laser beam used for recording or reproducing in the far field recording. Therefore, a recording density in the near field recording can be set to approximately ten times of the recording density in the far field recording.

In this case, the optical pick-up to be used in the optical disk apparatus of the present invention may be of a swing-arm type or a linear moving type that is used for an optical magnetic disk drive, a direct read after write disk drive, or a phase change type disk drive and also that is used for recording and/or reproducing information onto/from an optical recording medium such as a CD-ROM, a DVD or an optical card.

Figure 3A:
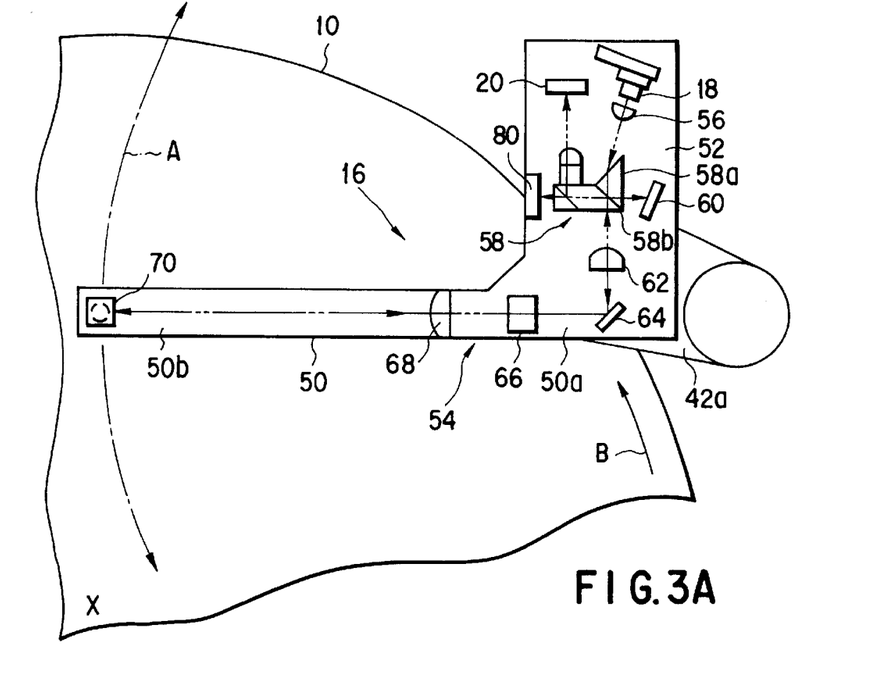
FIG. 3A is a top plan view for schematically showing an optical structure of a swing-arm type optical pick-up of the optical disk apparatus according to the first embodiment of the present invention.
Figure 3B:
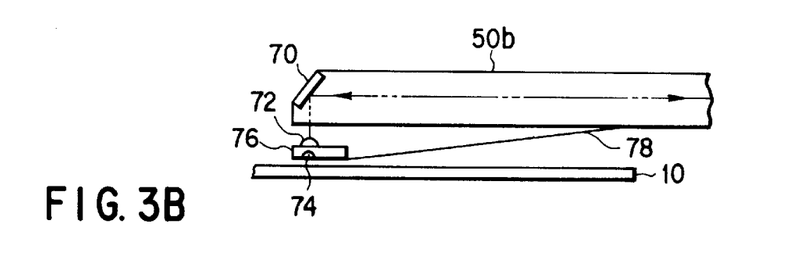
FIG. 3B is an enlarged vertical cross-sectional view for showing an enlarged view of a vertical cross section of a front end part of a swing-arm member of the swing-arm type optical pick-up in FIG. 3A.

FIG. 3A is a top plan view for schematically showing an optical structure of the swing-arm type optical pick-up 16 of the optical disk apparatus according to the first embodiment of the present invention, and FIG. 3B is an enlarged vertical cross-sectional view for showing an enlarged view of a vertical cross section of a front end part of a swing-arm member of the swing-arm type optical pick-up 16 in FIG. 3A.

As shown in FIG. 3A, the swing-arm type optical pickup 16 has a swing-arm member 54 of approximately an L-shaped plane surface including a first arm 50 and a second arm 52.

The first arm 50 has a base end portion 50a fixed to the swing carriage 42a of the voice coil motor (reference FIG. 2) disposed near the periphery of the optical disk 10 and an extended end portion 50b extended from the based end portion 50a to a direction orthogonal with a radial direction of the optical disk 10. The second arm 52 is formed to extend from the base end portion 50a of the first arm 50 to a direction orthogonal with the direction in which the first arm 50 extends from the base end portion 50a to the extended end portion 50b of the first arm 50.

The swing arm member 54 is swung by the voice coil motor 42 (reference FIG. 2) so as to make the extended end portion 50b of the first arm 50 reciprocally move in a radial direction of the optical disk 10 as shown by an arrow mark A in FIG. 3A along the recording layer not shown on the upper surface of the optical disk 10.

The swing arm member 54 is formed by a material of light weight with high stiffness, such as, for example, a magnesium alloy. In the present embodiment, the second arm 52 is extended from the base end portion 50a of the first arm 50 to a direction away from the periphery of the optical disk 10.

The semiconductor laser 18 is supported by the extended end portion of the second arm 52 of the swing arm member 54. The semiconductor laser 18 is operated by the laser driver 24 like a laser oscillating circuit not shown stored in an electromagnetic wave shield case not shown. With this arrangement, a laser beam scattering in an oval shape is emitted toward the base end portion 50a of the first arm 50.

The laser beam scattered in the oval shape from semiconductor laser 18 is converted into an oval-shaped parallel beam by condenser lens 56 disposed adjacent to the semiconductor lens 18. The oval-shaped parallel beam is incident to a prism 58a of a prism assembly unit 58 and is converted into a circular parallel beam. Thereafter, the circular parallel beam is divided into two by a beam splitter 58b of the prism assembly unit 58 interposed between the semiconductor laser 18 and an object lens.

One of the divided parallel beams is incident to a monitor photodetector 60, installed on a side wall of the second arms 52, for monitoring the waveform of a laser beam emitted from the semiconductor laser 18 for the monitoring section 26 (reference FIG. 1). The monitoring section 26 (reference FIG. 1) monitors the waveform that enters the monitor photodetector 60 and monitors the known droop characteristics that are generated when a light-emitting power becomes high at the time of deterioration of the semiconductor laser 18 as described before.

The other parallel beam of the parallel beam divided into two by the beam splitter 58b as described before is converged onto a galvanomirror 64 of the base end portion 50a of the first arm 50 of the swing arm member 50 through a relay lens 62. The galvanomirror 64 reflects the converged beam from the relay lens 62 to the extended end portion 50b of the first arm 50. Then, the converged beam from the galvanomirror 64 is incident to a half-prism 66 and is then divided into two.

One of the divided converged beams is guided to a monitor photodetector not shown installed on the upper surface of the half-prism 66. On the other hand, the other divided converged beam is returned to a parallel beam of a true circular shape through an imaging lens 68, and is thereafter guided to the recording layer on the upper surface of the optical disk 10 below a reflector 70.

The imaging lens 68 is disposed at the base end portion 50a of the first arm 50 of the swing-arm member 54. The reflector 70 is positioned at an end of the extended end portion 50b of the first arm 50.

Below the reflector 70, there are disposed an objective lens 72 and solid immersion lens (SIL) 74, shown in FIG. 3B. The objective lens 72 and the solid immersion lens 74 are supported by a slider 76 that functions in a manner similar to that of a slider for supporting a floating type magnetic head in the conventional magnetic hard disk apparatus. The slider 76 is supported to the extended end portion 50b of the first arm 50 by a slider supporting leaf spring 78 that functions in a manner similar to that of a slider supporting leaf spring of the floating type magnetic head in the conventional magnetic hard disk apparatus.

When information is recorded onto the recording layer not shown on the upper surface of the optical disk 10 or when information is reproduced from this recording medium by using a laser beam from the semiconductor laser 18 of the swing-arm member 54, the swing-arm member 54 is reciprocally moved within a predetermined range of distance by the swing carriage 42a of the voice coil motor 42 (reference FIG. 2) while the optical disk 10 is rotating at a predetermined rotation speed in a predetermined direction shown by an arrow mark B, for example. With this arrangement, the extended end portion 50b of the first arm 50, that is, the slider 76 accompanied with the objective lens 72 and the solid immersion lens 74, is moved in a radial direction of the optical disk 10, as shown by the arrow mark A, above the recording layer not shown on the upper surface of the optical disk 10.

During this period, the slider 76 accompanied with the objective lens 72 and the solid immersion lens 74 is slightly movable in the upper and lower directions by the elasticity of the supporting leaf spring 78. Accordingly, the slider accompanied with the objective lens 72 and the solid immersion lens 74 becomes buoyant to the height of the range between about 100 nm and about 150 nm above the upper surface of the rotating optical disk 10 by the wind generated by the rotating optical disk 10 as described above.

A parallel beam emitted to the recording layer not shown on the upper surface of the optical disk 10 through the objective lens 72 and the solid immersion lens 74 for the purpose of recording information onto the recording layer not shown on the upper surface of the optical disk 10 or for the purpose of reproducing information from the recording layer not shown is reflected by the recording layer not shown and is returned to the prism assembly unit 58 through the solid immersion lens 74, the objective lens 72, the imaging lens 68, the half prism 66, the galvanomirror 64 and the relay lens 62.

By the beam splitter 58b, the prism assembly unit 58 guides the reflected laser beam from the relay lens 62 to a servo photodetector 80 installed on the side wall of the second arm 52 of the swing-arm member 54 and to the monitor photodetector that structures the photodetector 20 installed on the extended end portion of the second arm 52.

When a recording of information onto the recording layer not shown on the upper surface of the optical disk 10 or a reproducing of information from the recording layer not shown is not carried out by using a laser beam from the semiconductor laser 18 of the swing arm member 54, the swing arm member 54 moves, by the swing carriage 42a of the voice coil motor 42 (reference FIG. 2), the extended end portion 50b of the first arm 50, that is, the slider 76 accompanied with the solid immersion lens 74 and the objective lens 72, in the radial direction of the optical disk 10 from the upper surface of the optical disk 10 toward the outside of the periphery of the optical disk 10.

In this case, the supporting leaf spring 78 for the slider 76 accompanied with the objective lens 72 and the solid immersion lens 74 moves the slider 76 accompanied with the objective lens 72 and the solid immersion lens 74 supported by a supporting leaf spring bearing not shown having a structure similar to that of a known supporting leaf spring bearing not shown for bearing a supporting leaf spring that supports the magnetic head in the conventional magnetic hard disk apparatus not shown, to a rest position above the above-described buoyant operating position and keeps the slider 76 at this position.

It is clear from the above description that the condenser lens 56, the prism assembly unit 58, the relay lens 62, the galvanomirror 64, the half prism 66, the imaging lens 68, the reflector 70, the objective lens 72 and the solid immersion lens 74 structure the solid optical system 22 shown in FIG. 1 in the swing-arm type pick-up apparatus 16.

Figure 4:
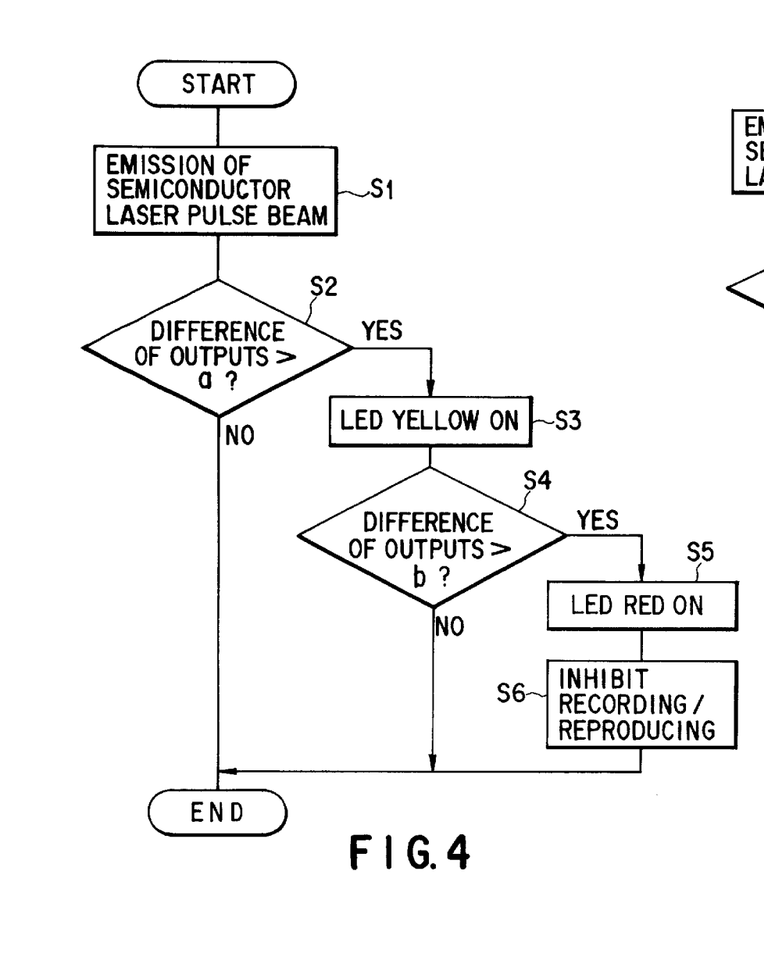
FIG. 4 is a flowchart for explaining a deterioration monitoring operation of a semiconductor laser in a closed-type optical disk apparatus according to the first embodiment.

The deterioration monitoring operation of the semiconductor laser in the closed-type optical disk apparatus having the above-described structure will be explained below with reference to a flowchart shown in FIG. 4.

At first, at step S1, when the semiconductor laser 18 is turned on through the laser driver 24 by an instruction from the control section 28, a predetermined laser pulse beam is emitted and irradiated onto the recording layer not shown of the optical disk 10.

Next, at step S2, when a waveform of a laser beam from the semiconductor laser 18 incident to the monitor photodetector 60 shown in FIG. 3A is monitored, a decision is made as to whether or not deterioration of the semiconductor 18 has started, that is, whether or not a difference of outputs from the semiconductor laser 18 is greater than a first predetermined level a. More specifically, the deterioration decision circuit within the monitoring section 26 makes a decision that the light-emitting characteristics of the semiconductor laser 18 have started to deteriorate if a difference between a first light emission output level at a first timing and a second light emission output level at a second timing later than the first timing among pulse responses of light emission outputs is larger than the first predetermined level (a decision level) a.

In this case, if the difference of laser outputs is equal to or smaller than the first predetermined level a, the present routine is finished. On the other hand, if the difference of laser outputs is larger than the first predetermined level a and a decision is made at step S2 that the light-emitting characteristics of the semiconductor laser 18 have started to deteriorate, the process moves to step S3.

Figure 5:
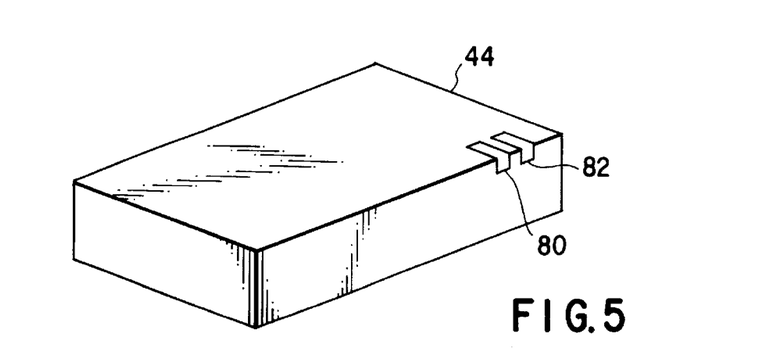
FIG. 5 is an appearance diagram for showing an example of a light-emitting diode provided in a closed-type optical disk apparatus.

At step S3, a yellow-color light-emitting diode (LED) within the display section 30 is turned on to emit light. For example, as shown in FIG. 5, there are provided a yellow-color light-emitting diode 80 and a red-color light-emitting diode 82 on the upper part of the cover plate 44 shown in FIG. 2. At step S3, a corresponding light-emitting diode is displayed by lighting.

Next, at step S4, in the state that the yellow-color light-emitting diode 80 is kept turned on, a state of deterioration of the semiconductor laser 18 is decided. In other words, the deterioration decision circuit makes a decision that the light-emitting characteristics of the semiconductor laser 18 are deteriorated if a difference between a first light emission output level at a first timing and a second light emission output level at a second timing later than the first timing among pulse responses of light emission outputs is larger than a second predetermined level (a decision level) b larger than the first predetermined level a.

In this case, if the difference of laser outputs has not reached the second predetermined level b, the present routine is finished. On the other hand, if the difference of laser outputs is larger than the second predetermined level b, the process moves to step S5 and the red-color light-emitting diode 82 is turned on. The process moves to step S6, where an instruction for turning off the semiconductor laser 18 is given from the control section 28, and irradiation of the semiconductor laser 18 is stopped. Thus, recording or reproducing of data by the semiconductor laser 18 is prohibited.

As explained above, according to the first embodiment, the red-color and yellow-color light-emitting diodes 80 and 82 are provided in the closed-type optical disk apparatus, a decision is made that deterioration of the semiconductor laser 18 has started when the droop characteristics have come to appear and then the yellow-color light emitting diode 80 is turned on, and if the droop characteristics are at or above a certain threshold value, a decision is made that the light-emitting characteristics of the semiconductor are completely deteriorated and then the red-color light-emitting diode 82 is turned on.

With the above-described arrangement, a user of the optical disk apparatus can know deterioration or a starting of deterioration of the semiconductor laser 18 by the lighting of the light-emitting diodes 80 and 82. Therefore, the user can take suitable measures so as not to lose information recorded on the recording layer of the optical disk 10 before the semiconductor laser 18 is completely destroyed. For example, a user who knows a starting of the semiconductor laser 18 can take measures to avoid the recording of information onto the optical disk 10 by taking care so as not to lose information that is being recorded due to complete deterioration of the semiconductor laser 18 during the recording of the information.

When deterioration of the semiconductor laser 18 is being displayed, the user can know that information is remained in the optical disk 10 even if this optical disk 10 is closed in the apparatus. The user can then take suitable measures, such as the replacement of the semiconductor laser 18, for reproducing the information again.

Deterioration of the semiconductor progresses gradually, and the deterioration is accelerated when the semiconductor laser is made to emit light at high output rate. When the semiconductor laser is used for recording information onto or reproducing information from the optical disk, the semiconductor laser is made to emit light at high output rate during the recording and is made to emit light at low output rate during the reproduction. Accordingly, once deterioration of the semiconductor laser has started, it is possible to prohibit recording of information that requires a light emission at high output rate and permit only a reproduction of information.

Figure 6:
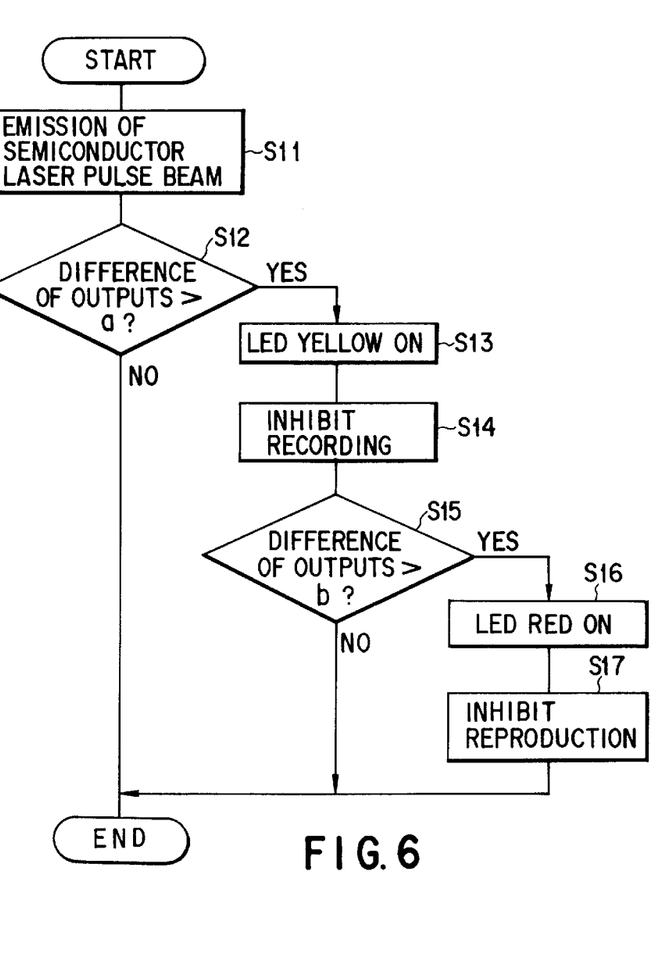
FIG. 6 is a flowchart for explaining a deterioration monitoring operation of a semiconductor laser in a closed-type optical disk apparatus according to a second embodiment of the invention.

FIG. 6 is a flowchart for explaining the monitoring operation of the deterioration of the semiconductor laser according to the second embodiment of the present invention for limiting the object of using the semiconductor laser as explained above. Mechanical and optical structures of the optical disk apparatus in the second embodiment are the same as those of the first embodiment, and their explanation will be omitted.

At first, at step S11, when the semiconductor laser 18 is turned on through the laser driver 24 by an instruction from the control section 28, a predetermined laser pulse beam is emitted and irradiated onto the recording layer not shown of the optical disk 10.

Next, at step S12, when a waveform of a laser beam from the semiconductor laser 18 incident to the monitor photodetector 60 shown in FIG. 3A is monitored, a decision is made as to whether or not deterioration of the semiconductor 18 has started, that is, whether or not a difference of outputs from the semiconductor laser 18 is greater than a first predetermined level a. More specifically, as described above, the deterioration decision circuit within the monitoring section 26 makes a decision that the light-emitting characteristics of the semiconductor laser 18 have started to deteriorate if a difference between a first light emission output level at a first timing and a second light emission output level at a second timing later than the first timing among pulse responses of light emission outputs is larger than the first predetermined level a.

In this case, if the difference of laser outputs is equal to or smaller than the first predetermined level a, the present routine is finished. On the other hand, if the difference of laser outputs from the semiconductor laser 18 is larger than the first predetermined level a and a decision is made at step S12 that the light-emitting characteristics have started to deteriorate, the process moves to step S13 and the yellow-color light-emitting diode 80 within the display section 30 is made to emit light.

Next, at step S14, the recording operation by the semiconductor laser 18 is prohibited. As described above, the semiconductor laser 18 for irradiating a laser beam onto the optical disk 10 emits light at high output rate at the time of the recording and emits light at low output rate at the time of the reproducing. Accordingly, only when deterioration of the semiconductor laser 18 has started, with the yellow-color light-emitting diode 80 being made to emit light, and at the same time in the case of the laser beam irradiation during a recording, the semiconductor laser 18 is turned off to stop the irradiation of the laser beam to prohibit the recording of information that requires a high-output light emission so as to delay the proceeding of the deterioration of the semiconductor laser 18.

Next, at step S15, a decision is made again about the state of deterioration of the semiconductor laser 18. In other words, the deterioration decision circuit within the monitoring section 26 makes a decision that the light-emitting characteristics of the semiconductor laser 18 are deteriorated if a difference between a first light emission output level at a first timing and a second light emission output level at a second timing later than the first timing among pulse responses of light emission outputs is larger than a second predetermined level b larger than the first predetermined level a.

In this case, if the difference of laser outputs is not larger than the second predetermined level b, the present routine is finished. On the other hand, if the difference of laser outputs is larger than the second predetermined level b, the process moves to step S16 and the red-color light-emitting diode 82 is turned on. Then, the process moves to step S17, where an instruction for turning off the semiconductor laser 18 is given from the control section 28, and irradiation of the semiconductor laser 18 is stopped to prohibit the reproducing of data as well as the recording of data.

As explained above, it is possible to know deterioration or a starting of deterioration of the semiconductor laser 18 by providing the red-color and yellow-color light-emitting diodes 80 and 82 in the closed-type optical disk apparatus. In addition, it is possible to delay the proceeding of the deterioration of the semiconductor laser 18 by compulsively prohibiting the high-output requiring recording operation once the deterioration of the semiconductor laser 18 has started.

By compulsively prohibiting the recording, a user of the optical disk apparatus is protected from losing information in the process of recording it due to complete deterioration of the semiconductor laser 18 in the middle of the recording, by avoiding such a situation that the user writes information onto the optical disk 10 without being aware of the starting of the deterioration of the semiconductor laser 18. When it comes impossible to write information by the semiconductor laser 18, information recorded on the optical disk 10 can be protected by reproducing this information and copying it to a separate information recording apparatus.

As explained above, according to the present invention, it is possible to provide an optical disk apparatus that can avoid the loss of information recorded on or to be recorded onto a closed and fixed optical magnetic disk in the case where a failure of the optical disk apparatus is attributable to the deterioration of the semiconductor laser.

Further, according to the present invention, it is possible to provide an optical disk apparatus that enables a user to know deterioration or a starting of deterioration of the semiconductor laser and that can prohibit a recording operation once deterioration of the semiconductor laser has started.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk apparatus having closed therein an optical recording medium capable of rewriting and reproducing information and a semiconductor laser capable of recording information onto or reproducing information from the optical recording medium, the optical disk apparatus comprising:

a swing arm type optical pickup on which the semiconductor laser is provided;

driving means for rotating the optical recording medium at a predetermined speed in a predetermined direction;

a monitoring section for: (i) causing a monitor photodetector to detect part of a laser beam emitted from the semiconductor laser, and (ii) monitoring waveform characteristics of the detected part of the laser beam which indicate deterioration of the semiconductor laser based on an output from the photodetector;

a deterioration decision section for deciding a state of deterioration of the semiconductor laser based on a result of a monitoring of the monitoring section; and a posting section for indicating both: (i) a start of deterioration of the semiconductor laser, and (ii) progression of deterioration of the semiconductor laser, based on an output of the deterioration decision section;

wherein said posting section operates at least when deterioration of the semiconductor laser occurs;

wherein the swing arm type optical pickup, the driving means and the optical recording medium are sealed between a cover plate and a substrate.

2. An optical disk apparatus according to claim 1, wherein the posting section changes over a plurality of display states according to the result of the decision of the deterioration decision section.

3. An optical disk apparatus according to claim 1, wherein the posting section includes a light display section.

4. An optical disk apparatus according to claim 3, wherein the light display section changes over a plurality of display states according to the result of the decision of the deterioration decision section.

5. An optical disk apparatus according to claim 3, wherein the light display section comprises a plurality of light-emitting diodes.

6. An optical disk apparatus according to claim 5, wherein the light display section comprises a plurality of light-emitting diodes having different display colors and the light display section makes display by changing over the display colors of the light-emitting diodes according to the result of the decision of the deterioration decision section.

7. An optical disk apparatus according to claim 4, wherein the deterioration decision section decides the state of deterioration of the semiconductor laser based on a light-emitting output of the semiconductor laser.

8. An optical disk apparatus according to claim 7, wherein the light display section comprises:

a first display section for making a first display corresponding to a first state in which deterioration of the semiconductor laser has started; and a second display section for making a second display corresponding to a second state in which deterioration of the semiconductor laser is being progressed.

9. An optical disk apparatus according to claim 1, further comprising:

a control section for stopping only an operation of recording information onto the optical recording medium by the semiconductor laser if the deterioration decision section decides that deterioration of the semiconductor laser is in progress.

10. An optical disk apparatus according to claim 9, further comprising a light display section for changing over a plurality of display states according to a result of a decision of the deterioration decision section.

11. An optical disk apparatus according to claim 10, wherein the deterioration decision section decides a progress state of the deterioration of the semiconductor laser based on a light-emitting output of the semiconductor laser.

12. An optical disk apparatus according to claim 11, wherein the deterioration decision section makes a decision that deterioration of the semiconductor laser has started if a difference of outputs from the semiconductor laser is larger than a first predetermined level and makes a decision that deterioration of the semiconductor laser is being progressed if a difference of outputs from the semiconductor laser is larger than a second predetermined level larger than the first predetermined level.

13. An optical disk apparatus according to claim 11, wherein the light display section has a first display section for making a first display corresponding to a first state in which deterioration of the semiconductor laser has started and a second display section for making a second display corresponding to a second state in which deterioration of the semiconductor laser is being progressed.

14. An optical disk apparatus according to claim 1, further comprising:

a control section for stopping driving of the semiconductor laser if the deterioration decision section decides that the semiconductor laser is deteriorated.

15. An optical disk apparatus according to claim 14, further comprising a light display section for changing over a plurality of display states according to a result of a decision of the deterioration decision section.

16. An optical disk apparatus according to claim 15, wherein the control section stops the driving of the semiconductor laser if the deterioration decision section has made a decision that a difference between a first light emission output level at a first timing and a second light emission output level at a second timing later than the first timing among pulse responses of light emission outputs is larger than a first predetermined level and that an output from the semiconductor laser is at a high level.

17. An optical disk apparatus according to claim 16, wherein the light display section comprises a plurality of light-emitting diodes.

18. An optical disk apparatus according to claim 16, wherein the deterioration display section has a first display section for making a first display corresponding to a first state in which deterioration of the semiconductor laser has started and a second display section for making a second display corresponding to a second state in which deterioration of the semiconductor laser is being progressed.

19. An optical disk apparatus according to claim 2, wherein the posting section includes a light display section.

20. An optical disk apparatus according to claim 19, wherein the light display section changes over a plurality of display states according to the result of the decision of the deterioration decision section.

21. An optical disk apparatus according to claim 19, wherein the light display section comprises a plurality of light-emitting diodes.

22. An optical disk apparatus according to claim 21, wherein the light display section comprises a plurality of light-emitting diodes having different display colors and the light display section makes display by changing over the display colors of the light-emitting diodes according to the result of the decision of the deterioration decision section.

23. An optical disk apparatus according to claim 20, wherein the deterioration decision section decides the state of deterioration of the semiconductor laser based on a light-emitting output of the semiconductor laser.

24. An optical disk apparatus according to claim 23, wherein the light display section comprises:

a first display section for making a first display corresponding to a first state in which deterioration of the semiconductor laser has started; and a second display section for making a second display corresponding to a second state in which deterioration of the semiconductor laser is being progressed.

25. An optical disk apparatus having closed therein an optical recording medium capable of rewriting and reproducing information and a semiconductor laser capable of recording information onto or reproducing information from the optical recording medium, the optical disk apparatus comprising:

a monitoring section for monitoring a progress state of deterioration of the semiconductor laser;

a deterioration decision section for deciding a state of deterioration of the semiconductor laser based on a result of a monitoring of the monitoring section; and a posting section for indicating a result of a decision of the deterioration decision section;

wherein the posting section includes a light display section;

wherein the light display section changes over a plurality of display states according to the result of the decision of the deterioration decision section;

wherein the deterioration decision section decides the state of deterioration of the semiconductor laser based on a light-emitting output of the semiconductor laser; and wherein the light display section comprises a first display section for making a first display corresponding to a first state in which deterioration of the semiconductor laser has started, and a second display section for making a second display corresponding to a second state in which deterioration of the semiconductor laser is being progressed.

26. An optical disk apparatus having closed therein an optical recording medium capable of rewriting and reproducing information and a semiconductor laser capable of recording information onto or reproducing information from the optical recording medium, the optical disk apparatus comprising:

a monitoring section for monitoring a progress state of deterioration of the semiconductor laser;

a deterioration decision section for deciding a state of deterioration of the semiconductor laser based on a result of a monitoring of the monitoring section;

a control section for stopping only an operation of recording information onto the optical recording medium by the semiconductor laser if the deterioration decision section decides that deterioration of the semiconductor laser is in progress; and a light display section for changing over a plurality of display states according to a result of a decision of the deterioration decision section;

wherein the deterioration decision section decides a progress state of the deterioration of the semiconductor laser based on a light-emitting output of the semiconductor laser;

wherein the deterioration decision section makes a decision that deterioration of the semiconductor laser has started if a difference of outputs from the semiconductor laser is larger than a first predetermined level and makes a decision that deterioration of the semiconductor laser is being progressed if a difference of outputs from the semiconductor laser is larger than a second predetermined level larger than the first predetermined level; and wherein the light display section has a first display section for making a first display corresponding to a first state in which deterioration of the semiconductor laser has started and a second display section for making a second display corresponding to a second state in which deterioration of the semiconductor laser is being progressed.

27. An optical disk apparatus having closed therein an optical recording medium capable of rewriting and reproducing information and a semiconductor laser capable of recording information onto or reproducing information from the optical recording medium, the optical disk apparatus comprising:

a monitoring section for monitoring a progress state of deterioration of the semiconductor laser;

a deterioration decision section for deciding a state of deterioration of the semiconductor laser based on a result of a monitoring of the monitoring section;

a control section for stopping driving of the semiconductor laser if the deterioration decision section decides that the semiconductor laser is deteriorated; and a light display section for changing over a plurality of display states according to a result of a decision of the deterioration decision section;

wherein the control section stops the driving of the semiconductor laser if the deterioration decision section has made a decision that a difference between a first light emission output level at a first timing and a second light emission output level at a second timing later than the first timing among pulse responses of light emission outputs is larger than a first predetermined level and that an output from the semiconductor laser is at a high level; and wherein the deterioration display section has a first display section for making a first display corresponding to a first state in which deterioration of the semiconductor laser has started and a second display section for making a second display corresponding to a second state in which deterioration of the semiconductor laser is being progressed.

28. An optical disk apparatus having closed therein an optical recording medium capable of rewriting and reproducing information and a semiconductor laser capable of recording information onto or reproducing information from the optical recording medium, the optical disk apparatus comprising:

a monitoring section for monitoring a progress state of deterioration of the semiconductor laser;

a deterioration decision section for deciding a state of deterioration of the semiconductor laser based on a result of a monitoring of the monitoring section; and a posting section for indicating a result of a decision of the deterioration decision section;

wherein the posting section changes over a plurality of display states according to the result of the decision of the deterioration decision section;

wherein the posting section includes a light display section;

wherein the light display section changes over a plurality of display states according to the result of the decision of the deterioration decision section;

wherein the deterioration decision section decides the state of deterioration of the semiconductor laser based on a light-emitting output of the semiconductor laser; and wherein the light display section comprises a first display section for making a first display corresponding to a first state in which deterioration of the semiconductor laser has started, and a second display section for making a second display corresponding to a second state in which deterioration of the semiconductor laser is being progressed.

* * * * *